United States Patent
Hawkins

(10) Patent No.: US 11,585,326 B2
(45) Date of Patent: Feb. 21, 2023

(54) BEARING PROTECTION ARRANGEMENT

(71) Applicant: Siemens Gamesa Renewable Energy A/S, Brande (DK)

(72) Inventor: Samuel H. Hawkins, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 180 days.

(21) Appl. No.: 16/642,711

(22) PCT Filed: Aug. 13, 2018

(86) PCT No.: PCT/EP2018/071866
§ 371 (c)(1),
(2) Date: Feb. 27, 2020

(87) PCT Pub. No.: WO2019/042751
PCT Pub. Date: Mar. 7, 2019

(65) Prior Publication Data
US 2020/0232446 A1 Jul. 23, 2020

(30) Foreign Application Priority Data
Aug. 28, 2017 (DE) .................. 10 2017 214 995.7

(51) Int. Cl.
*F03D 80/70* (2016.01)
*F03D 17/00* (2016.01)
(Continued)

(52) U.S. Cl.
CPC ............. *F03D 80/70* (2016.05); *F03D 17/00* (2016.05); *F03D 7/0204* (2013.01); *F03D 7/026* (2013.01);
(Continued)

(58) Field of Classification Search
None
See application file for complete search history.

(56) References Cited

U.S. PATENT DOCUMENTS 7,740,448 B2 * 6/2010 Meyer .................. F03D 7/024
416/27
8,678,607 B2 * 3/2014 Anderson .............. F21S 9/026
362/183
(Continued)

FOREIGN PATENT DOCUMENTS

CA 2831361 A1 4/2014
CA 2901364 A1 3/2016
(Continued)

OTHER PUBLICATIONS

International Search Report and the Written Opinion for related PCT Patent Application No. PCT/EP2018/071866, dated Nov. 28, 2018. 15 pages.
(Continued)

*Primary Examiner* — Christopher R Legendre
(74) *Attorney, Agent, or Firm* — Schmeiser, Olsen & Watts LLP

(57) ABSTRACT

A bearing protection arrangement of a journal bearing arranged between a housing and a rotary component of a wind turbine. The bearing protection arrangement includes a wind speed monitor arranged to monitor wind speed in the vicinity of the wind turbine and to generate a wake-up signal when the wind speed exceeds a pre-defined minimum; a mode switch module of a backup battery arranged to provide restart power to an auxiliary of the wind turbine, which mode switch module is adapted to switch the backup battery from a normal-power mode into a low-power mode to conserve sufficient restart power after low wind-speed conditions, and to switch the backup battery from the low-power mode into a normal-power mode in response to the wake-up signal. A wind turbine and a method of protecting a journal bearing of a wind turbine during standstill.

12 Claims, 7 Drawing Sheets

(51) Int. Cl.
*F03D 9/25* (2016.01)
*F03D 7/02* (2006.01)

(52) U.S. Cl.
CPC .............. *F03D 7/0224* (2013.01); *F03D 9/25* (2016.05); *F05B 2270/32* (2013.01); *F05B 2270/321* (2013.01); *F05B 2270/329* (2013.01); *F05B 2270/335* (2013.01)

(56) References Cited

U.S. PATENT DOCUMENTS

| | | | | |
|---|---|---|---|---|
| 9,821,892 | B2* | 11/2017 | Johnson | G01F 25/00 |
| 10,202,965 | B2* | 2/2019 | Bertolotti | G01M 15/14 |
| 10,774,812 | B2* | 9/2020 | Tanno | F03D 9/11 |
| 2007/0057516 | A1 | 3/2007 | Mever et al. | |
| 2009/0066089 | A1 | 3/2009 | Arinaga et al. | |
| 2009/0302608 | A1 | 12/2009 | Andresen | |
| 2010/0314873 | A1 | 12/2010 | Stone | |
| 2011/0091321 | A1* | 4/2011 | Baker | F03D 7/047 416/61 |
| 2011/0291416 | A1 | 12/2011 | Edenfeld | |
| 2012/0134808 | A1 | 5/2012 | Lindberg | |
| 2012/0148403 | A1 | 6/2012 | Flaherty et al. | |
| 2012/0313377 | A1 | 12/2012 | Mackay et al. | |
| 2013/0108443 | A1 | 5/2013 | Uphues et al. | |
| 2013/0214535 | A1 | 8/2013 | Brath | |
| 2016/0076516 | A1 | 3/2016 | Butterworth et al. | |
| 2016/0178121 | A1 | 6/2016 | Conley et al. | |
| 2020/0166017 | A1 | 5/2020 | Hansen et al. | |
| 2020/0232446 | A1* | 7/2020 | Hawkins | F03D 80/70 |

FOREIGN PATENT DOCUMENTS

| | | |
|---|---|---|
| CN | 1928352 A | 3/2007 |
| CN | 101608603 A | 12/2009 |
| CN | 201408116 Y | 2/2010 |
| CN | 104751657 A | 7/2015 |
| CN | 105257484 A | 1/2016 |
| CN | 205101173 U | 3/2016 |
| EP | 1918581 A2 | 5/2008 |
| EP | 3635247 A1 | 4/2020 |
| GN | 101395369 A | 3/2009 |
| WO | 2012025121 A2 | 3/2012 |

OTHER PUBLICATIONS

Wang Zheming, et al: "Error Correction of Rotary Wind Speed Sensor in Wind Turbine", Shandong Industrial Technology Journal, vol. 23,(C)1994-2022 China Academic Journal Electronic Publishing House, DOI:10.16640/j.cnki.37-1222/t.2014.23.152, p. 32-34, Dec. 15, 2014.

* cited by examiner

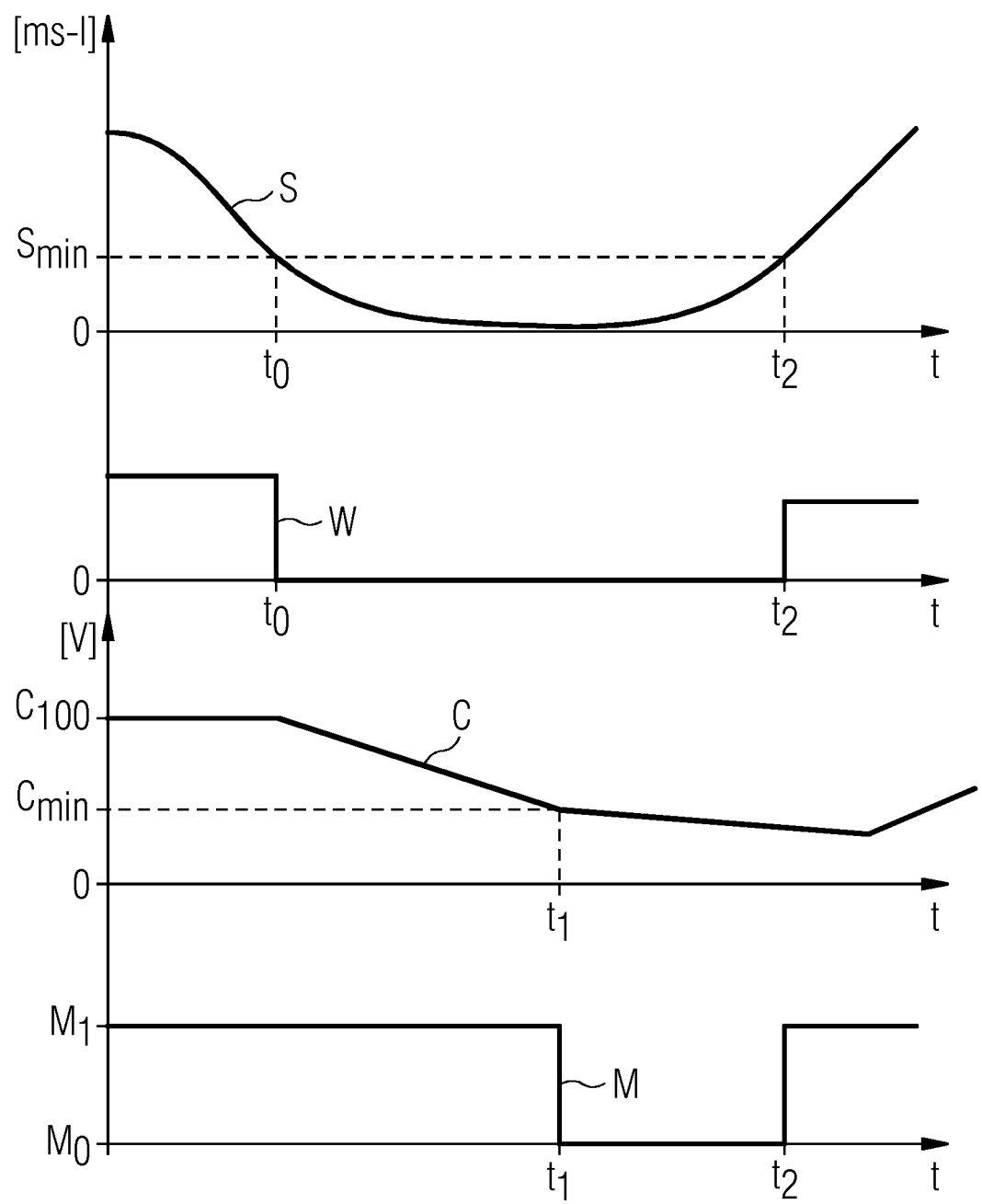

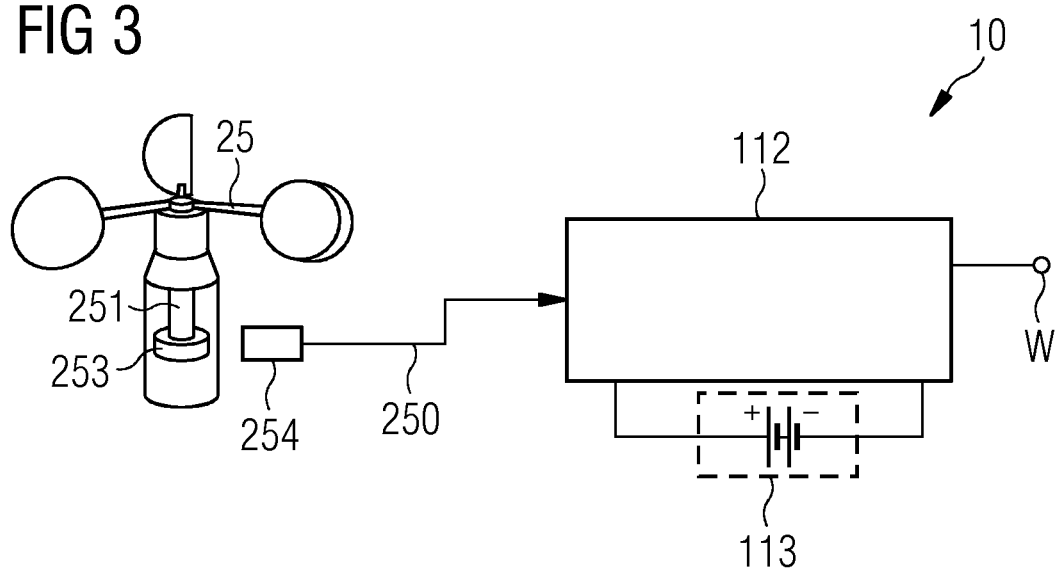
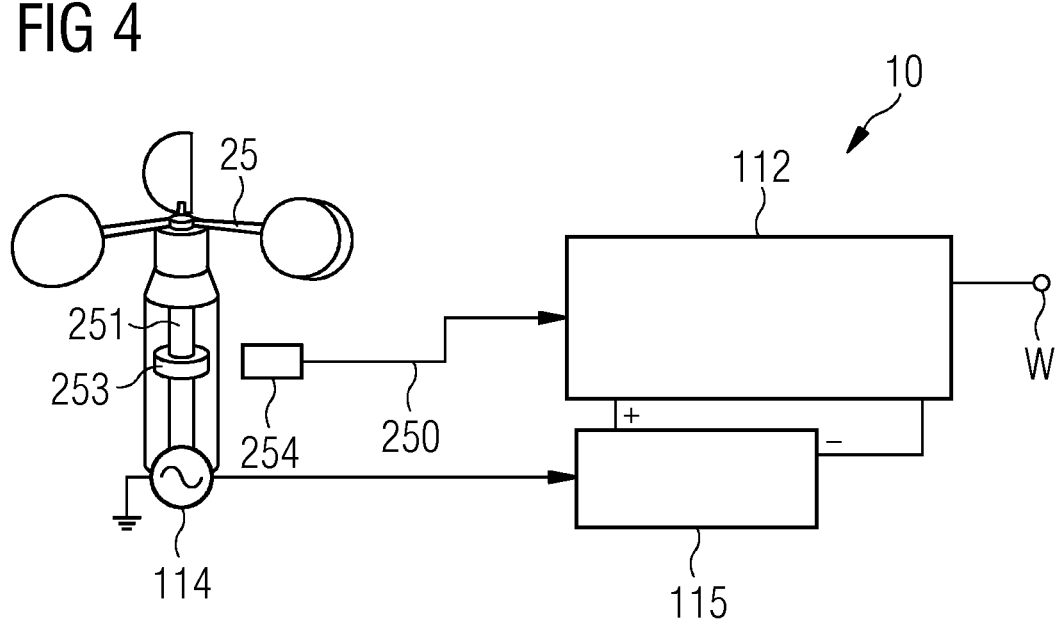

BEARING PROTECTION ARRANGEMENT

CROSS-REFERENCE TO RELATED APPLICATIONS

This application claims priority to PCT Application No. PCT/EP2018/071866, having a filing date of Aug. 13, 2018, based on DE 10 217 214 995.7, having a filing date of Aug. 28, 2017, the entire contents of both are hereby incorporated by reference.

FIELD OF TECHNOLOGY

The following describes a protection arrangement for a journal bearing. The following further describes a wind turbine, and a method of protecting a journal bearing of a wind turbine during standstill.

BACKGROUND

In some types of wind turbine, the aerodynamic rotor of the wind turbine may be connected to a journal or shaft of a drivetrain that extends through a housing, which in turn is mounted to a bedframe of the wind turbine. The aerodynamic rotor of the wind turbine turns relatively slowly. Due to their advantage in durability and handling of high loads, and because they are equally applicable for use in slow rotation and fast rotation applications, journal bearings (also referred to as plane bearings or fluid bearings) may be used at any part of the drive train. In a gearbox turbine, a gearbox increases the rotational speed of the low-speed rotor shaft to a higher speed for an electrical generator, and a journal bearing may be used at a first or second stage where the loading is high.

In contrast to ball bearings or roller bearings, journal bearings do not make use of rolling elements within the bearing. Instead, the journal or shaft is only separated from the bearing housing by a thin film of lubricant such as oil. With this type of bearing, a minimum rate of rotation is necessary in order to maintain a sufficient lubricant film between the shaft and the housing when the shaft is subject to radial loading. In other words, to maintain a satisfactory state within the bearing, the rotation rate of the shaft should ideally not drop below a certain lower threshold for any prolonged length of time.

For a journal bearing, a problem arises when the rate of shaft rotation drops below that minimum threshold. When that happens, the radial loading on the shaft will result in a high friction contact between the shaft and the bearing liner. This can result in permanent damage to the bearing, and a replacement is a very expensive undertaking.

However, with the known wind turbine designs, it is not always possible to ensure that the shaft always rotates at a speed that is above the safe threshold. This is because the rate of drive train rotation is dependent on wind speed. If the wind speed is too low, the drive train rotational speed will not be sufficient to prevent bearing damage from radial loading.

For these reasons, a wind turbine may be designed to respond to such a low wind speed situation by deploying a brake system that holds the aerodynamic rotor and the shaft at standstill. A "standstill" state during which the brakes are engaged can persist for an indefinite length of time. The brake system ensures that the bearing will not undergo any damage when there is no wind or only insufficient wind speed to turn the rotor shaft at the minimum required rate.

Alternatively, instead of providing a brake system to hold the rotary component during low wind conditions, a pump can be provided to supply lubricant under pressure in order to "float" the rotary component on a layer of pressurized lubricant within the bearing. Such an arrangement does not need any brakes and can cope with very low rotation speeds. However, if there is a grid failure, the pump must be powered by the wind turbine. When wind drops too low for the wind turbine to generate sufficient power, the pump ceases operation. During this standstill time, static friction in the bearing acts as a brake and is sufficient to prevent the aerodynamic rotor from turning. However, when the wind speed picks up again, the pump must restart to "float" the shaft again before the aerodynamic rotor resumes turning. In the absence of the grid, for example during a grid failure, the pump must be powered by the wind turbine's backup battery. In a wind turbine that uses several journal bearings, one or both types of brake may be deployed as appropriate.

The controller of such a wind turbine will generally be equipped with some means of receiving wind speed data, for example from an external wind-speed sensor such as an anemometer mounted on the nacelle, or from a wind park controller. When the wind speed increases again to a level above the critical minimum, this is reported to the wind turbine controller, which releases the brake system, and the drive train will once again be able to rotate at a rate that ensures adequate lubrication.

A wind turbine generally comprises various auxiliaries which must be continually provided with power. Auxiliaries can be fans, controllers, etc., and the brake system and lubricant pump mentioned above are also auxiliaries. As long as the aerodynamic rotor is turning, power is generated for the grid, and may also be used to power the wind turbine controller and the auxiliaries. When the aerodynamic rotor is stationary (e.g. during calm conditions, stormy conditions, etc.), the auxiliaries of the wind turbine can be provided with power from the grid. However, a reliable power supply from the grid is not always guaranteed. For this reason, power generated by the wind turbine or received from the grid is also used to charge an internal battery backup or auxiliary power supply.

When wind speeds are too low, i.e. too low for the wind turbine to generate power, the brake system will be engaged to hold the rotor shaft in position in order to avoid damage to the journal bearings. The brakes will only be released when the wind speed has increased again to a level that will cause the aerodynamic rotor to rotate at the required minimum rate. However, if a grid failure has occurred and the battery backup is depleted during this time, the wind turbine controller will be unable to receive any data, and will be unable to process wind speed readings from an external wind speed sensor. In such a situation, there is no way for the controller to determine when the wind speed is sufficiently high to allow the brake system to be released.

This can result in a serious problem, since the wind speed may become so high that the aerodynamic rotor is forcibly turned, even though the brakes are still engaged. This can lead to serious brake and rotor shaft damage. Such a situation may even be a fire hazard due to heat generated by friction from the brake slippage and bearing slippage in the absence of lubrication.

To avoid such serious damage, the known wind turbine designs generally include a battery backup with sufficient capacity to reliably provide auxiliary power during a worst-case scenario in which the wind turbine is disconnected from the grid during prolonged calm or windless conditions lasting for several hours or even days. The wind turbine can generate power for its auxiliary systems in the event of a grid failure, as long as there is sufficient wind to turn the aerodynamic rotor. However, during a calm period in which there is not enough wind to turn the aerodynamic rotor, and during which there is no grid supply, the battery must provide power to various auxiliaries. The battery must be able to provide sufficient power to put the wind turbine back into operation, for example to release the brakes, to operate the yaw drive to turn the aerodynamic rotor into the wind, etc. However, the cost of a battery increases with size, so that a large battery backup with the capacity necessary to outlast such a long standstill state is a very expensive component, adding to the overall cost of the wind turbine.

Furthermore, battery systems can lose capacity over time, for example if the battery is not properly maintained to correctly complete charging/discharging cycles. Correct maintenance of a battery may necessitate cooling of the battery to avoid extreme temperatures, and avoiding prolonged durations at low charge levels. If the battery system loses capacity, it may be unable to provide power during prolonged standstill conditions until such time when the brakes may be released again.

SUMMARY

In the context of embodiments of the invention, the wind turbine comprises a rotary component, a bearing housing, and a journal bearing arranged between the housing and the rotary component. The rotary component may be the outer rotor of a direct-drive wind turbine, for example, or a rotor shaft of a geared wind turbine. It may be assumed that one or more journal bearings are used to ensure the required stability of the relevant components and to support the rotary component.

According to embodiments of the invention, the bearing protection arrangement is adapted for such a wind turbine, and comprises a wind speed monitor arranged to monitor wind speed in the vicinity of the wind turbine and to generate a wake-up signal when the wind speed exceeds a pre-defined minimum; and a mode switch module of a backup battery arranged to provide restart power to one or more auxiliaries of the wind turbine. The mode switch module is adapted to switch the backup battery from a normal-power mode into a low-power mode to conserve sufficient restart power after low wind-speed conditions, and to switch the backup battery into a normal-power mode in response to the wake-up signal. The predefined minimum wind speed for a particular wind turbine may be determined on the basis of the size of its aerodynamic rotor, the diameter of the rotor shaft, the dimensions of an outer rotor, etc.

During the low-power mode or "sleep" mode, the only component that draws power is the input terminal of the wind turbine controller that is configured to receive the "wake-up" signal from the wind speed monitor. All other auxiliaries or components of the wind turbine are powered off. The brakes of the aerodynamic rotor will remain engaged. To this end, the brakes may be passive brakes that are automatically engaged in the absence of power, or may comprise a hydraulic valve configured to maintain pressure on the brakes in the absence of power.

An advantage of the inventive bearing protection arrangement is that it ensures that there will always be sufficient battery charge available to release the brakes of the brake system after prolonged calm or low wind speed conditions. Instead of allowing the battery charge to steadily deplete, a portion of the remaining charge in the battery is reserved for the purpose of safely releasing the brakes. For example, the mode switch module may place the battery into the low-power mode in order to conserve a certain charge level that will be needed to release the brakes and/or to power a lubricant pump of a journal bearing. The inventive method reliably ensures that this reserved amount will be available when required, regardless of the duration of the standstill condition. Sufficient restart power is also reserved for aligning the aerodynamic rotor into the wind.

According to embodiments of the invention, the wind turbine is of the type described above and comprises a number of auxiliary systems arranged to restart the wind turbine safely after low wind-speed conditions; and also comprises an embodiment of the inventive bearing protection arrangement.

Such a wind turbine will always be able to respond in a safe manner when wind speeds pick up again after prolonged calm or low wind speed conditions. This can be ensured without having to provide an excessively large capacity battery, so that the overall costs of the wind turbine can be kept favourably low.

According to the embodiments of the invention, the backup battery of such a wind turbine is arranged to provide restart power to one or more number of auxiliaries to safely restart the wind turbine after low wind-speed conditions. As explained above, such an auxiliary may be a brake system for halting the rotary component in order to protect a journal bearing from damage during low wind conditions, a lubricant pump for such a bearing, etc. The backup battery can also provide power to a yaw system to correctly re-align the aerodynamic rotor into the wind. The auxiliaries ensure that the wind turbine can correctly and safely resume operation after a calm period. The backup battery is characterized by a mode switch module adapted to switch the backup battery from a normal-power mode into a low-power mode during a state of insufficient wind speed in order to conserve sufficient restart power, and to switch the backup battery from the low-power mode back into a normal-power mode in response to a wake-up signal. The wake-up signal can originate from a wind speed monitor as described above, when the wind speed increases again after the low wind-speed state.

An advantage of such a backup battery is that it can be realised by upgrading an existing backup battery arrangement. During low wind-speed conditions, the mode switch module can monitor the remaining battery charge. At some point during such a standstill phase, the mode switch module will cause the battery to enter a "sleep" mode or low-power mode in order to maintain a minimum reserve that will be used to bring the wind turbine back into operation when the wind speed picks up again. The mode switch module can comprise an input terminal for receiving the wakeup signal. The mode switch module can comprise any suitable electric and/or electronic components for evaluating and responding to these events.

According to embodiments of the invention, the method of protecting a journal bearing of such a wind turbine during standstill comprises the steps of providing a wind speed monitor to measure wind speed in the vicinity of the wind turbine and to generate a wake-up signal when the wind speed exceeds a pre-defined minimum; arranging a backup battery to provide restart power to an auxiliary of the wind turbine; switching the backup battery from a normal-power mode into a low-power mode to conserve sufficient restart power; and switching the backup battery back to the normal-power mode in response to the wake-up signal.

An advantage of the inventive method is that it provides a straightforward way of ensuring that there will be sufficient battery charge to release the brakes and to bring the wind turbine back into operation when the wind speed picks up again after a prolonged standstill time. Being able to correctly respond to the increasing wind speeds ensures that the bearing will not be damaged through forced rotation or slippage. The method also avoids the need for a large and expensive high-capacity battery as described above.

Particularly advantageous embodiments and features of the present invention are given, as revealed in the following description. Features of different claim categories may be combined as appropriate to give further embodiments not described herein.

The wind speed monitor utilizes a wind speed sensor that is arranged on the exterior of the wind turbine. In a particularly exemplary embodiment of the invention, the wind speed sensor is realized as a vertical axis anemometer such as a Robinson cup anemometer. The advantage of a vertical axis anemometer is that it can correctly measure the wind speed independently of wind direction. An advantage of using a Robinson cup anemometer is that this type of anemometer has been in widespread use for decades, and there is a large body of knowledge relating the wind speed to the rate of rotation of the anemometer's vertical axis.

In a particularly exemplary embodiment of the present invention, the wind speed monitor comprises a rotary encoder adapted to generate a digital wind speed value on the basis of the rotation rate of the anemometer's vertical axis. The rotary encoder can comprise a wheel or disc mounted to the anemometer's vertical axis, and a contactless sensor such as an infrared sensor arranged to count the rotations of the wheel or disc. The sensor outputs a digital signal for the rotations per minute (rpm) of the wheel. The wind speed value is therefore provided as the digital output of the sensor. In this embodiment, the wind speed monitor also comprises a digital signal processor (DSP) adapted to generate the wake-up signal on the basis of the wind speed value. The DSP comprises a memory in which the minimum wind speed is stored, and a comparator arranged to compare the values of minimum wind speed and measured wind speed. The DSP also comprises a means of establishing whether the measured wind speed exceeds the minimum wind speed for a sufficient length of time before generating the wakeup signal.

In an exemplary embodiment of the present invention, the DSP is realised to consume as little power as possible, and is powered by a small rechargeable battery. Alternatively, the DSP could be powered by the backup battery of the wind turbine, since it only consumes a relatively small amount of power. Of course, the digital signal processor would be powered during the entire standstill duration, and this would be taken into consideration when the battery reserve is computed before placing the battery in its low-power mode.

In a further exemplary embodiment of the present invention, the wind speed monitor can comprise a rotary encoder, a digital signal processor and a small generator to supply power to the components of the wind speed monitor, wherein the vertical axis of the cup anemometer serves as the rotor of the small generator.

In an alternative embodiment of the present invention that uses a cup anemometer, the wind speed monitor comprises a generator adapted to generate a voltage in proportion to the rate of rotation of the anemometer's vertical axis, and wherein the vertical axis of the anemometer is realised as the rotor of the generator. A rectifier is adapted to provide a DC voltage, and this voltage is directly related to the wind speed in a well-defined manner. A potentiometer is arranged to calibrate the output voltage to the rate of rotation of the anemometer's vertical axis. The wind speed monitor comprises a Zener diode with a reverse breakdown voltage chosen such that the wake-up signal remains low while the rotational velocity of the anemometer's vertical axis is below a rate corresponding to the pre-defined minimum wind-speed.

Instead of using a cup anemometer, in an exemplary embodiment of the present invention the wind speed monitor comprises one or more ultrasonic wind speed sensors adapted to generate a digital wind speed value. An ultrasonic wind speed sensor or ultrasonic anemometer measures wind speed based on the time-of-flight of sonic pulses between transducer pairs. An advantage of using an ultrasonic anemometer is the lack of moving parts, and its robustness in the exposed position on the wind turbine nacelle. One or more ultrasonic anemometers are connected to a suitable acoustic wind sensor interface that is powered by the battery backup of the wind turbine. The interface is configured to output a digital wind speed measurement to the wind turbine controller during normal operation of the wind turbine. The interface comprises a suitable component that is configured to generate the wake-up signal on the basis of the digital wind speed measurement during a low wind-speed. If the battery has already been placed in its low-power mode of operation to conserve power, the wake-up signal will cause it to be switched back into normal-power mode so that the wind turbine can resume operation in a safe and controlled manner.

Other aspects and features of the present invention will become apparent from the following detailed descriptions considered in conjunction with the accompanying drawings. It is to be understood, however, that the drawings are designed solely for the purposes of illustration and not as a definition of the limits of the present invention.

BRIEF DESCRIPTION

Some of the embodiments will be described in detail, with reference to the following figures, wherein like designations denote like members; wherein:

FIG. 2 shows a number of graphs illustrating a relationship between wind speed, wakeup signal, and battery operating modes for an embodiment of the bearing protection arrangement;

FIG. 3 shows a first embodiment of a wind speed monitor for the bearing protection arrangement;

FIG. 4 shows a second embodiment of a wind speed monitor for the bearing protection arrangement;

In the diagrams, like numbers refer to like aspects throughout. Aspects in the diagrams are not necessarily drawn to scale.

DETAILED DESCRIPTION

Figure 1:
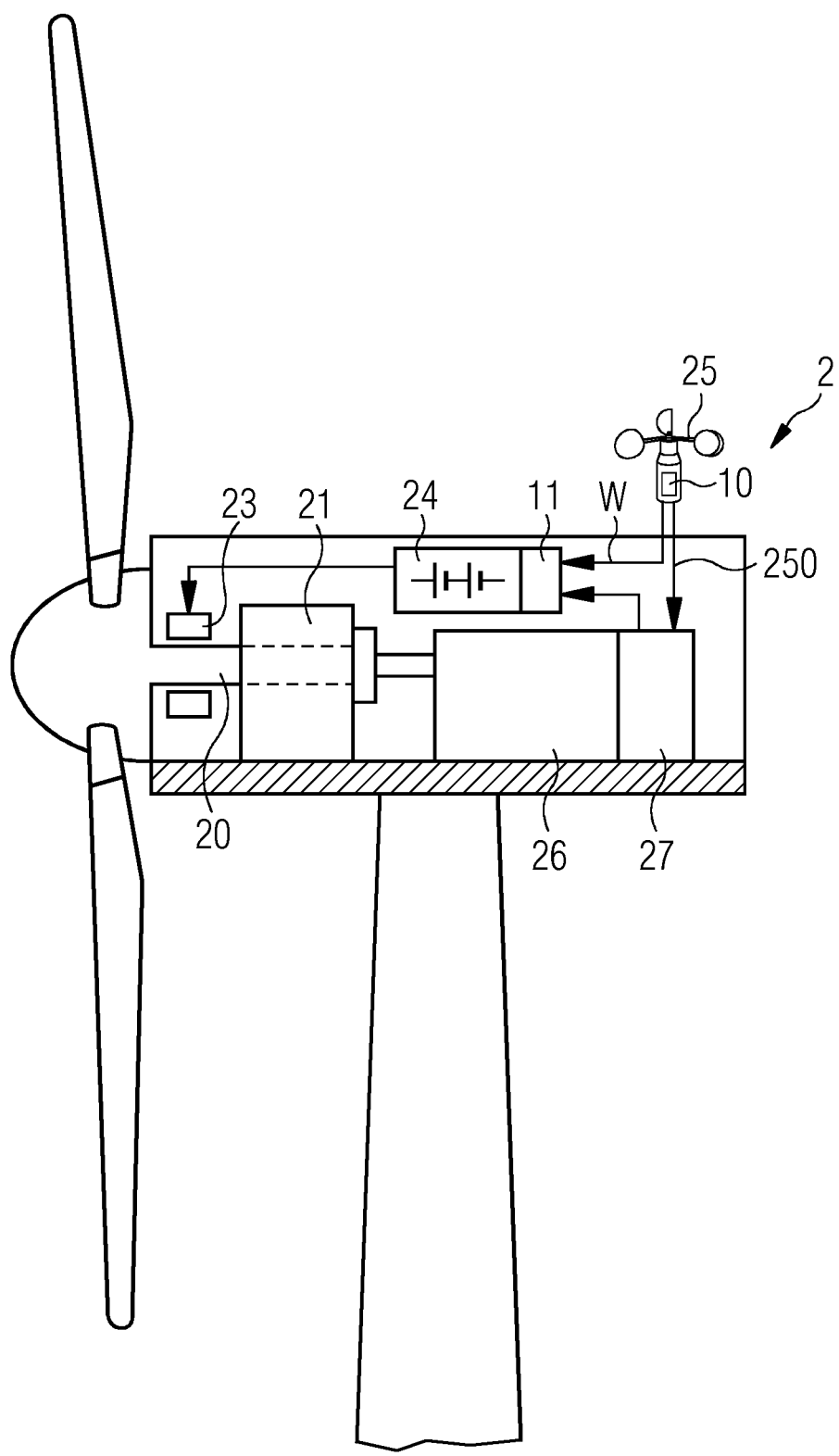
FIG. 1 shows an embodiment of a wind turbine.

FIG. 1 shows an embodiment of the inventive wind turbine 2. Here, the wind turbine 2 is a geared wind turbine that uses one or more journal bearings, but it shall be understood that the bearing protection arrangement is equally applicable to a journal bearing of a direct-drive wind turbine. The relevant components of the wind turbine 2 are a low-speed rotor shaft 20, a rotor shaft housing 21, and a journal bearing (not visible in the diagram) arranged between the housing 21 and the rotor shaft 20. In this embodiment, an auxiliary component is a brake system 23 arranged to engage or lock the low-speed shaft 20 during low wind-speed conditions. An embodiment of the inventive bearing protection arrangement is indicated by a wind monitor 10 and a mode switch module 11. Other components are a gearbox that links the low speed shaft 20 to a high speed shaft to drive a generator 26; and a wind turbine controller 27 that controls the various components as necessary.

In this exemplary embodiment, the bearing protection arrangement comprises a wind speed monitor 10 incorporated in an exterior cup anemometer 25 that is mounted on the top of the nacelle of the wind turbine 2. A cup anemometer 25 is usually configured to provide the controller 27 with a wind speed measurement 250 so that the controller 27 can respond accordingly, for example to pitch the blades as necessary, to activate the brake system 23, etc. The wind speed monitor 10 generates a wake-up signal W when the wind speed exceeds a pre-defined minimum. The bearing protection arrangement further comprises a mode switch module 11 of a backup battery arrangement 24 that is installed in the wind turbine 2 for the purpose of providing power to various auxiliaries.

In this exemplary embodiment, one of these auxiliaries is the brake system 23 which must lock or hold the shaft 20 during calm or standstill weather conditions. During such standstill conditions, the mode switch module 11 monitors the battery capacity C and switches the backup battery 24 into a low-power mode when the remaining battery capacity has decreased to a predefined minimum capacity required to provide restart power to the auxiliaries. When the wind speed increases above the minimum wind speed, the wind speed monitor 10 issues a wake-up signal to the mode switch module 11, which can then switch the backup battery 24 back to normal-power mode of operation, so that the brakes can be released in time to prevent damage to the bearing and rotor shaft.

FIG. 2 shows a number of graphs illustrating the relationship between wind speed S, wakeup signal W, battery capacity C and battery operating modes M0, M1 for an embodiment of the inventive bearing protection arrangement. The upper part of the diagram shows wind speed S. As long as the wind speed is above a certain minimum $S_{min}$, the aerodynamic rotor of the wind turbine will be caused to rotate at speeds that are sufficient to maintain the necessary film of lubricant in the bearing described in FIG. 6 below. Power generated during this time can be used to ensure that the backup battery is charged.

As long as the wind speed is below that minimum $S_{min}$ (at time $t_0$ in the diagram), the wake-up signal W is "low" or "0". This state will persist during standstill between time $t_0$ and time $t_2$, i.e. as long as the wind speed remains below the minimum $S_{min}$. The brakes will be engaged when the wind speed drops below that minimum $S_{min}$, in order to protect the bearing from damage during standstill. Since the aerodynamic rotor can no longer turn and power can no longer be generated, the backup battery must supply power to the auxiliaries, including the brake system. The mode switch module of the backup battery monitors the charge level C as it depletes during standstill. When a predefined minimum charge level $C_{min}$ is reached (at time $t_1$ in the diagram), the mode switch module switches the backup battery into a low-power mode M0 as indicated in the lower part of the diagram. The predefined minimum charge level $C_{min}$ can have been determined at some prior stage, for example by measuring the amount of energy necessary to align the aerodynamic rotor for operation and to release the brakes from the rotary component. The low-power mode M0 is indicated here as a "0" level, and the normal-power mode M1 is indicated by a level of "1". Of course, these modes M0, M1 can be defined in any appropriate manner. During the low-power mode M0, power from the battery backup will only be used to power the electronic circuitry needed to receive a wake-up signal. All other functions are disabled by the wind turbine controller during this "sleep" mode M0. Essentially, everything is turned off during this low-power mode M0, including the wind turbine controller and the battery controller or mode switch module; the only component that consumes power is the circuit that is configured to receive the wake up signal. This ensures that there will be sufficient charge to be able to release the brakes and to align the aerodynamic rotor for operation.

When the wind speed increases above the minimum $S_{min}$ again (at time $t_2$ in the diagram), the wake-up signal W goes "high". The wake-up signal W causes the mode switch module of the backup battery to return to the normal power mode M1. The backup battery can now provide the necessary power to release the brakes and to drive any lubricant pump so that the aerodynamic rotor can turn again. The backup battery can also provide the necessary power to align the aerodynamic rotor correctly into the wind in readiness for operation so that power can be generated once more by the wind turbine. The backup battery can then be recharged by the power generated by the wind turbine. As long as the wind speed is above that minimum $S_{min}$, the wake-up signal W from the wind speed monitor can remain "high" or "1", and will go low again at the beginning of a subsequent standstill state.

It should be understood that the wind speed should reliably remain above the minimum $S_{min}$ for a while before the brakes are released. The wind speed curve S in this diagram may be assumed to show an average wind speed obtained by averaging or smoothing wind speed values collected for at least several minutes. The diagram shows several curves that may be understood to extend over the same duration of time, which can be measured in minutes, hours or even days. For simplicity, the event times $t_0$, $t_1$, $t_2$ are shared by the different curves, however it should be understood that the relevant events (e.g. wind speed increases above minimum $S_{min}$; battery mode returns to normal M1) are not necessarily simultaneous.

FIG. 3 shows a possible realisation of a wind speed monitor 10. The wind speed monitor 10 comprises a Robinson cup anemometer 25 that has a rotating vertical axis 251. In this realisation, a rotary encoder comprising an encoder wheel 253 and a suitable sensor 254 such as an infrared sensor is used to encode the rpm of the rotating vertical axis 251 as a digital signal 250 which is forwarded to a digital signal processor 112. An advantage of using a contactless rotary encoder 253, 254 is that the wind speed measurements from the cup anemometer are very accurate. The DSP 112 can compare the received signal 250 with a stored rpm value that corresponds to the minimum wind speed $S_{min}$. This rpm value can be stored locally in a memory of the DSP 112. If the result of the comparison indicates that the wind speed is greater than the minimum wind speed $S_{min}$, a wakeup signal W is issued. In this embodiment, the DSP 112 and sensor 254 are configured to consume as little power as possible, and receive power from a small rechargeable battery supply 113.

FIG. 4 shows an embodiment similar to that of FIG. 3, using a rotary encoder as described above, and further incorporating a small generator 114 coupled to a battery 115, configured to supply power to the digital signal processor 112. An advantage of this embodiment is that the accurate anemometer speed signal 250 can be processed by a DSP 112, but an additional battery is not needed.

Figure 5:
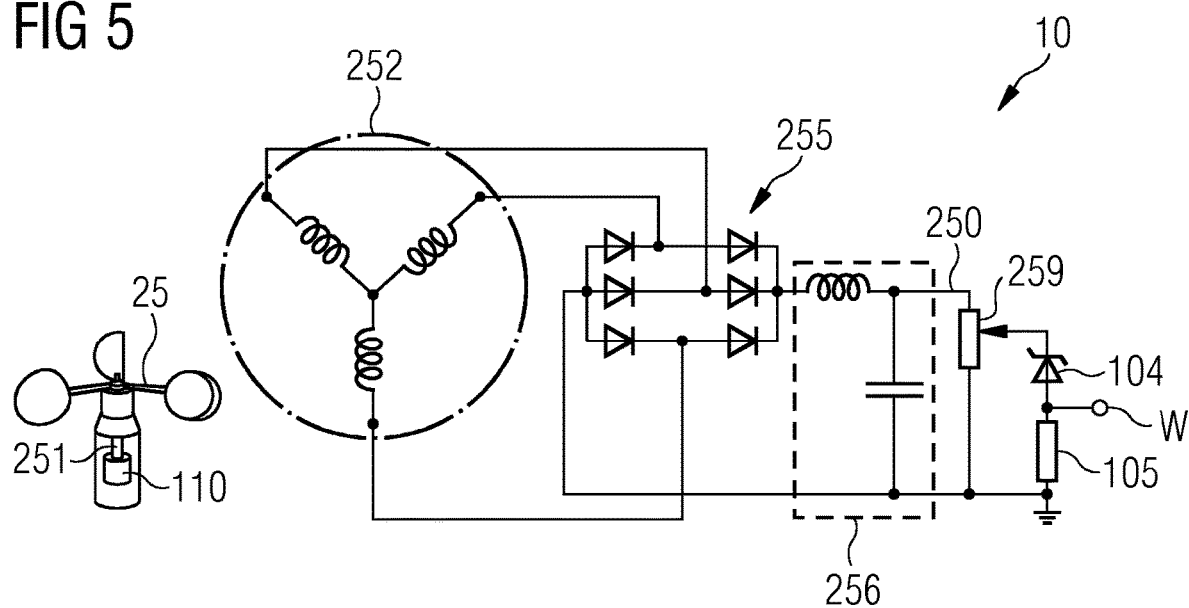
FIG. 5 shows a third embodiment of a wind speed monitor for the bearing protection arrangement.

FIG. 5 shows an alternative embodiment in which the wind speed monitor 10 is configured to use the rotating vertical axis 251 of a Robinson cup anemometer as the rotor of a generator. The torque necessary to turn the vertical axis 251 is provided by the wind. Here, the wind speed monitor 10 uses a three-phase permanent magnet generator 252 arranged to use the vertical axis as its rotor. Permanent magnet generators have a simple speed-voltage relationship, allowing a favourably precise calibration of the wind speed monitor. Furthermore, the three-phase motor eliminates "cogging torque" which might otherwise affect the accuracy of the wind speed monitor 10. An AC-DC power rectifier 255 converts the AC power from the generator 252 into DC, and a low-pass filter 256 is used to remove any remaining AC components from the DC wind speed signal 250 and to smooth any variation in the signal due to short-term wind speed fluctuations or turbulence. A potentiometer 259 is used to fine-tune or calibrate the DC voltage 250 to the rate of rotation of the vertical axis 251 of the local generator 252. A Zener diode 104 with a specific reverse breakdown voltage is arranged at the output of the wind speed monitor 10. The reverse breakdown voltage is a voltage that corresponds to the predefined minimum wind speed $S_{min}$ indicated in FIG. 2, and this voltage can be determined during the calibration stage. When the voltage at the potentiometer 259 is lower than the level that corresponds to the minimum wind speed $S_{min}$, the Zener diode 104 will block current flow such that the voltage of the output signal or wake-up signal W will be "low" (e.g. 0 Volts relative to a reference ground). When the voltage across the Zener diode increases above the predefined level, indicating that wind speed is higher than the predefined minimum wind speed $S_{min}$, current is able to cross a high-impedance resistor 105, so that the wake-up signal W goes "high" (e.g. several Volts above the reference ground). The skilled person will be aware of how to choose a value of the high-impedance resistor 105 to ensure that current flow does not exceed the capacity of the Zener diode 104.

Figure 6:
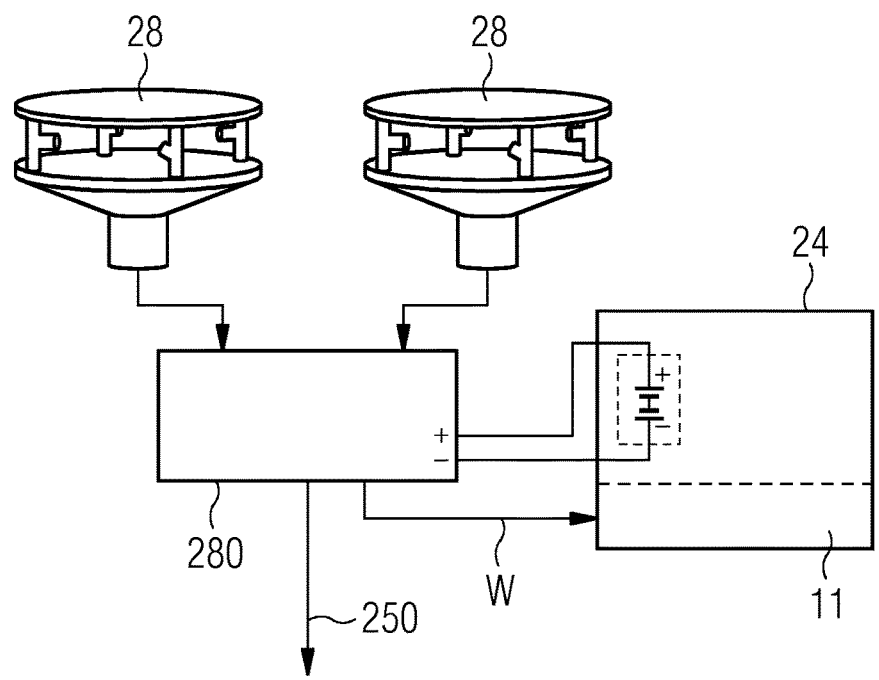
FIG. 6 shows a fourth embodiment of a wind speed monitor for the bearing protection arrangement.

FIG. 6 shows an alternative embodiment in which the wind speed monitor 10 comprises a number of ultrasonic anemometers 28. These are arranged to deliver wind speed values to an interface module 280. The interface module 280 comprises a suitable component such as a processor that will generate a wake-up signal W to the mode switch module 11 when the wind speed is above a minimum wind speed $S_{min}$. During low wind-speed conditions, the interface module 280 can be powered by the battery backup 24 and configured to consume as little power as possible.

Figure 7:
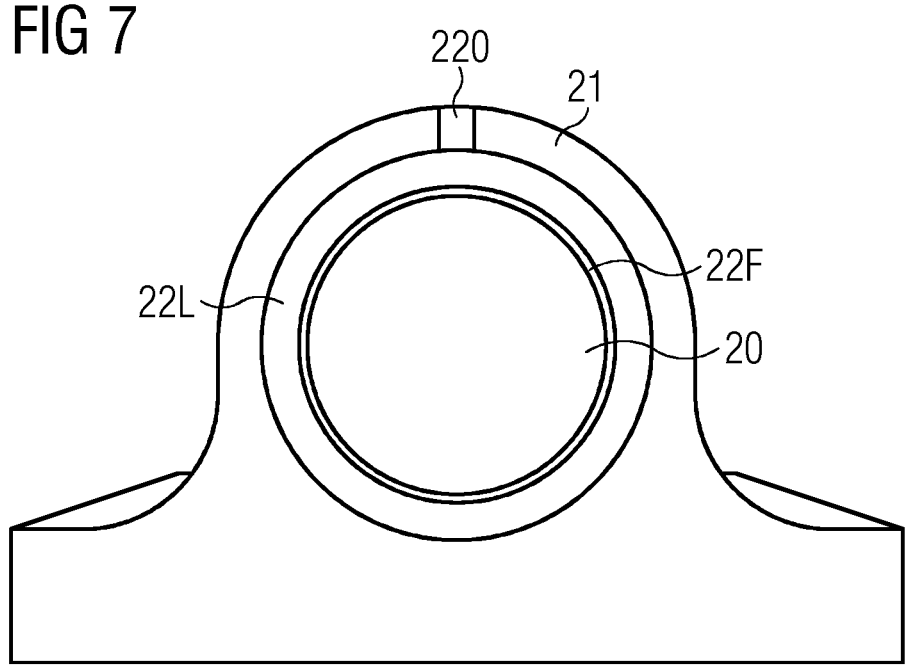
FIG. 7 shows a cross-section through a rotor shaft, housing and bearing.

FIG. 7 shows a cross-section through a rotor shaft 20 and housing 21 of the wind turbine 2 of FIG. 1 above. The inner bore of the housing 21 is lined with a bearing liner 22L, and the rotor shaft 20 and bearing liner 22L are separated by a lubricant film 22F. Lubricant can be topped up through an inlet 220. It is important that the lubricant film 22F is maintained at all times when the shaft 20 rotates. When the rotational rate is insufficient to ensure this, the shaft 20 should be locked or held in place by the brake system 23 described above. Alternatively, instead of providing a brake system to hold the shaft during low wind conditions, a pump can be provided to supply pressurized lubricant through the nozzle 220 in order to "float" the shaft 20 on a layer of pressurized lubricant 22F.

Figure 8:
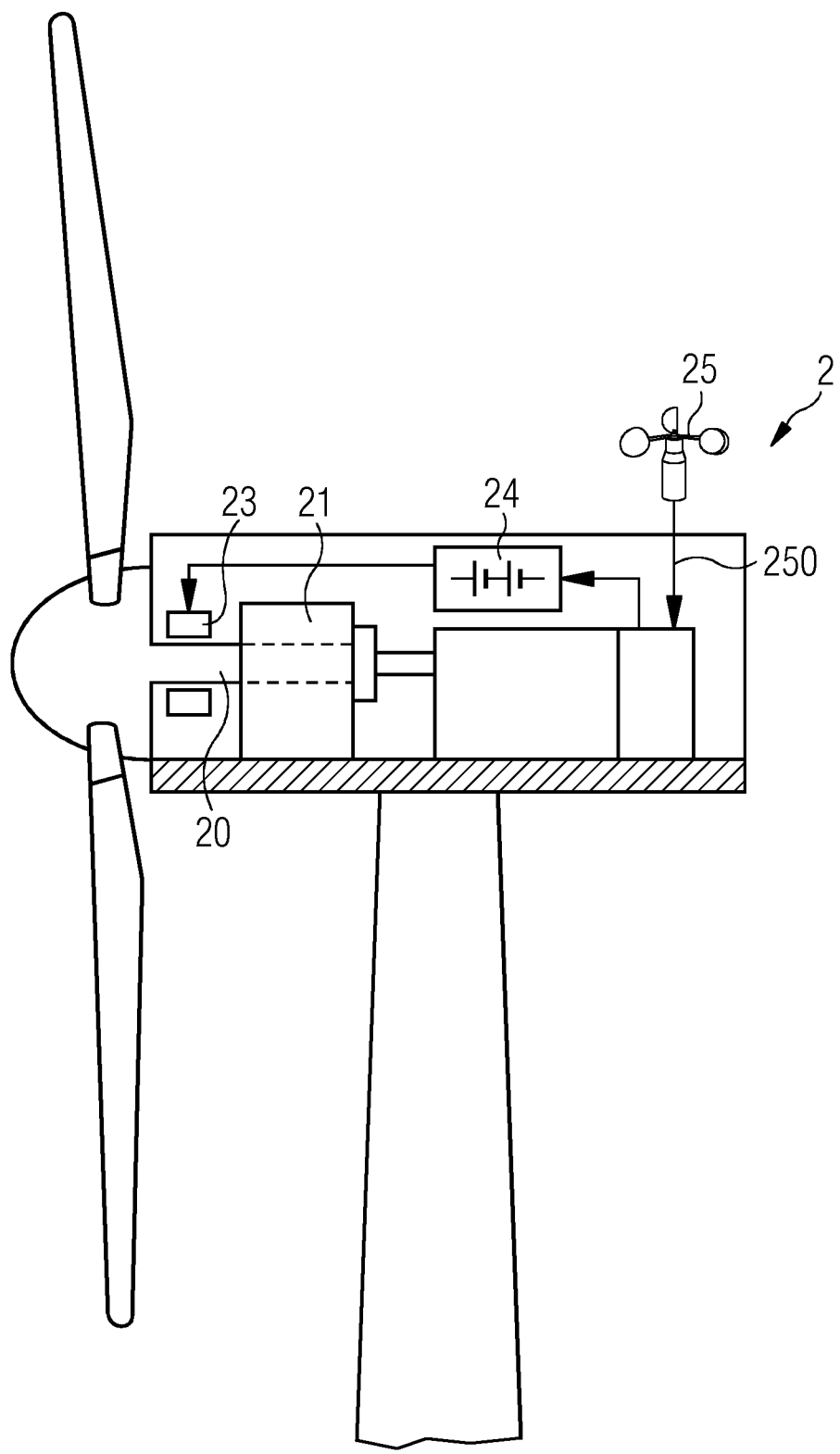
FIG. 8 shows a prior art wind turbine.

FIG. 8 shows a prior art wind turbine 2. The diagram shows the usual backup battery 24 arranged to supply power to auxiliaries including a brake system 23 arranged to hold or lock the shaft 20, for example during conditions of insufficient wind speed. A wind speed sensor 25 is provided on the nacelle to deliver wind speed measurements 250 to the wind turbine controller 27. This is possible as long as there is power available, for example power generated by the wind turbine itself, or power drawn from the backup battery 24. However, if the backup battery 24 is the only source of power and has been depleted after prolonged low wind speed weather conditions, it will be unable to release the brakes 23 that were engaged to protect the bearing in the housing 21. Severe damage can result as explained in the introduction.

Figure 9:
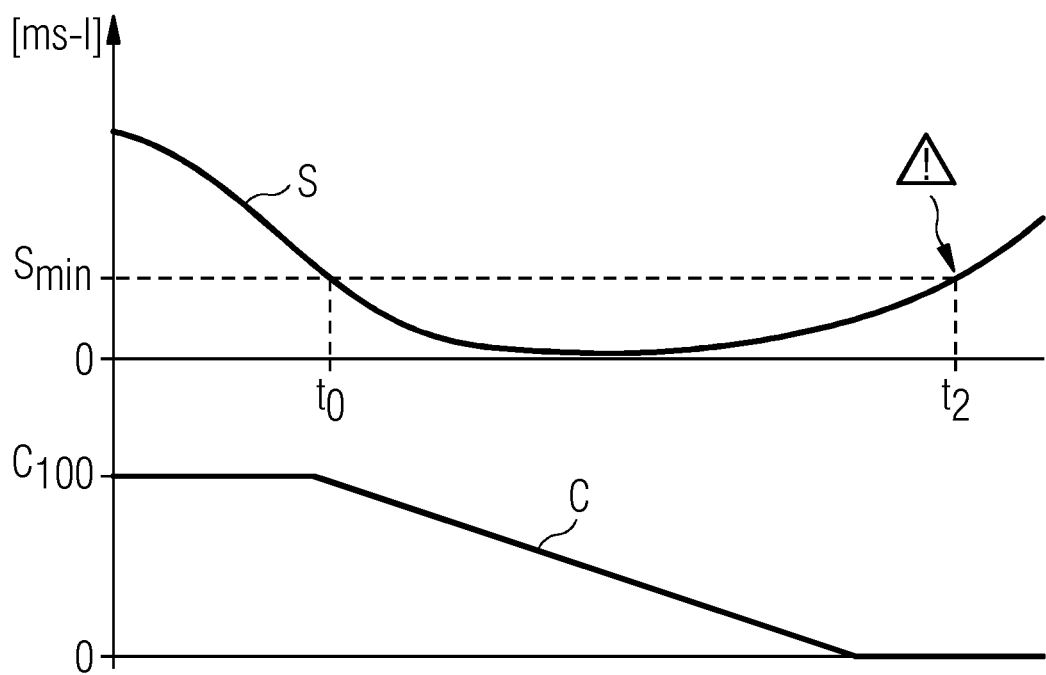
FIG. 9 shows wind speed and battery charge level for the wind turbine of FIG. 8.

FIG. 9 shows wind speed S and battery charge level C for the prior art wind turbine of FIG. 8. Here, when low wind speed or very calm conditions persist for a prolonged duration—several hours or even days—the charge level C of the backup battery may be completely depleted by the time the wind speed increases again above the minimum $S_{min}$. In that case, the backup battery is unable to release the brakes, and serious damage may result by wind forcibly turning the aerodynamic rotor against the engaged brakes.

Although the present embodiment has been described in accordance with the exemplary embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bearing protection arrangement of a journal bearing of a wind turbine, the bearing protection arrangement comprising:
  a wind speed monitor arranged to monitor wind speed in a vicinity of the wind turbine and to generate a wake-up signal when the monitored wind speed increases from less than a predefined minimum speed to greater than the predefined minimum speed; and
  a backup battery having a low-power mode in which only circuitry for receiving the wake-up signal is powered thereby and a normal-power mode in which a brake system of the wind turbine is powered thereby,
  a mode switch module configured to:
    switch the backup battery from the normal-power mode into the low-power mode when a charge level of the backup battery is less than a predefined minimum capacity, and
    switch the backup battery from the low-power mode into the normal-power mode in response to the wake-up signal.

2. The bearing protection arrangement according to claim 1, wherein the wind speed monitor is incorporated in a wind speed sensor arranged on an exterior of the wind turbine.

3. The bearing protection arrangement according to claim 2, wherein the wind speed sensor comprises a vertical axis anemometer.

4. The bearing protection arrangement according to claim 3, wherein the wind speed monitor comprises a rotary encoder configured to generate a digital wind speed value on a basis of a rotational velocity of the vertical axis anemometer.

5. The bearing protection arrangement according to claim 4, wherein the wind speed monitor comprises a digital signal processor adapted to generate the wake-up signal on the basis of the digital wind speed value.

6. The bearing protection arrangement according to claim 2, wherein the wind speed monitor comprises an ultrasonic wind speed sensor configured to generate a digital wind speed value.

7. The bearing protection arrangement according to claim 1, comprising a rechargeable battery arranged to provide power to components of the wind speed monitor.

8. The bearing protection arrangement according to claim 1, wherein the backup battery is arranged to provide power to a lubricant pump arrangement of the journal bearing in response to the wake-up signal being generated.

9. The bearing protection arrangement according to claim 1, wherein the backup battery is arranged to provide power to a yaw system of the wind turbine in response to the wake-up signal being generated.

10. A wind turbine comprising:
the bearing protection arrangement according to claim 1;
a rotary component and a housing, wherein the journal bearing is arranged between the housing and the rotary component;
a number of auxiliary systems arranged to restart the wind turbine after the wake-up signal is generated.

11. A method of protecting a journal bearing of a wind turbine during standstill, the method comprising:
providing a wind speed monitor to measure wind speed in a vicinity of the wind turbine and to generate a wake-up signal when the measured wind speed increases from less than a predefined minimum speed to greater than the predefined minimum speed;
providing a backup battery having a low-power mode in which only circuitry for receiving the wake-up signal is powered thereby and a normal-power mode in which a brake system of the wind turbine is powered thereby;
switching the backup battery from the normal-power mode into the low-power mode when a charge level of the backup battery is less than a predefined minimum capacity; and
switching the backup battery to the normal-power mode in response to the wake-up signal.

12. The method according to claim 11, wherein the predefined minimum capacity of the backup battery is determined in a prior step of calculating an amount of energy necessary to turn an aerodynamic rotor of the wind turbine into the wind and to release brakes of the brake system and/or to operate a lubricant pump of the journal bearing.

* * * * *